United States Patent
Hui et al.

(10) Patent No.: US 9,571,422 B2
(45) Date of Patent: Feb. 14, 2017

(54) CROSS-LAYER FORWARDING IN A LOW-POWER AND LOSSY NETWORK

(71) Applicant: Cisco Technology, Inc., San Jose, CA (US)

(72) Inventors: Jonathan W. Hui, Belmont, CA (US); Nitin Nayar, San Jose, CA (US); Jean-Philippe Vasseur, Saint Martin d'Uriage (FR)

(73) Assignee: Cisco Technology, Inc., San Jose, CA (US)

( * ) Notice: Subject to any disclaimer, the term of this patent is extended or adjusted under 35 U.S.C. 154(b) by 594 days.

(21) Appl. No.: 13/945,050

(22) Filed: Jul. 18, 2013

(65) Prior Publication Data
US 2015/0023348 A1 Jan. 22, 2015

(51) Int. Cl.
*H04L 12/931* (2013.01)

(52) U.S. Cl.
CPC ..................... *H04L 49/20* (2013.01)

(58) Field of Classification Search
CPC ...... H04L 49/205; H04L 45/302; H04L 45/38; H04L 47/10; H04L 49/20
See application file for complete search history.

(56) References Cited

U.S. PATENT DOCUMENTS

| | | | | |
|---|---|---|---|---|
| 7,400,590 B1 * | 7/2008 | Rygh | ..................... | H04L 12/462 370/254 |
| 8,213,313 B1 * | 7/2012 | Doiron | ................... | H04L 43/028 370/235 |
| 8,279,864 B2 * | 10/2012 | Wood | ................... | H04L 12/5695 370/389 |
| 2009/0225671 A1 * | 9/2009 | Arbel | ................... | H04L 12/2602 370/252 |
| 2011/0176416 A1 * | 7/2011 | Bhatti | ....................... | H04N 7/18 370/230 |
| 2013/0051250 A1 * | 2/2013 | Shaffer | ................... | H04L 45/22 370/252 |
| 2013/0121335 A1 | 5/2013 | Hui et al. | | |
| 2013/0159479 A1 * | 6/2013 | Vasseur | ................... | H04L 47/10 709/221 |

OTHER PUBLICATIONS

JP Vasseur et al., titled "RPL: The IP routing protocol designed for low power and lossy networks (Release Apr. 2011)", (Vasseur2 hereinafter) was published Apr. 2011, pp. 01-20.*

(Continued)

*Primary Examiner* — Andrew Lai
*Assistant Examiner* — Hoyet H Andrews, III
(74) *Attorney, Agent, or Firm* — Edell, Shapiro & Finnan, LLC

(57) ABSTRACT

In accordance with techniques presented herein, a packet is received at a forwarding device operating in a multi-service Low-power and Lossy Network (LLN). The forwarding device is configured to retrieve service requirements associated with the packet and obtain forwarding information from a plurality of networking layers associated with forwarding of the packet. The forwarding device is further configured to evaluate the service requirements in view of the forwarding information to dynamically adjust one or more parameters within the LLN for use in forwarding packets within the LLN.

25 Claims, 5 Drawing Sheets

(56) References Cited

OTHER PUBLICATIONS

M Kim et al., titled "Routing Metrics Used for Path Calculation in Low-Power and Lossy Networks (Release Mar. 2012)", Request for Comments: 6551, (Kim hereinafter) was published Mar. 2012, pp. 01-30.*

J. Martocci et al., Request for Comments: 5867; Titled, Building Automation Routing Requirements in Low-Power and Lossy Networks, developed by Internet Engineering Task Force (IETF); identified in Category: Informational, having ISSN: 2070-1721, published Jun. 2010.*

* cited by examiner

CROSS-LAYER FORWARDING IN A LOW-POWER AND LOSSY NETWORK

TECHNICAL FIELD

The present disclosure relates to packet forwarding in a Low-power and Lossy network.

BACKGROUND

Low-power and Lossy Networks (LLNs) communicate using low data rate links, such as Radio-Frequency (RF) links defined by the Institute of Electrical and Electronics Engineers (IEEE) 802.15.4 standard or Power Line Communication (PLC) links defined by the IEEE P1901.2 standard. LLNs experience a number of issues that may make communication between nodes challenging. For example, the radio or physical links within LLNs are strongly affected by environmental conditions that change over time. These changes may include temporal changes in interference (e.g., other wireless networks or electrical appliances), physical obstruction (e.g. doors opening/closing or seasonal changes in foliage density of trees), and propagation characteristics of the physical media (e.g. temperature or humidity changes). The time scales of such temporal changes can range between milliseconds (e.g. transmissions from other transceivers) to months (e.g. seasonal changes of outdoor environment).

Other issues result from the use of low-cost and low-power designs that the limit the capabilities of the LLN transceivers. In particular, LLN transceivers typically provide low throughput and typically support limited link margin, making the effects of interference and environmental changes visible to link and network protocols. Interference may be from external sources (non-network devices generating electromagnetic interference) or internal sources (other network devices communicating within the same frequency band).

DESCRIPTION OF EXAMPLE EMBODIMENTS

Overview

In accordance with techniques presented herein, a packet is received at a forwarding device operating in a multi-service Low-power and Lossy Network (LLN). The forwarding device is configured to retrieve service requirements (e.g., quality-of-service (QoS) requirements, delays, packet delivery rate, etc.) associated with the packet and obtain forwarding information from a plurality of networking layers associated with forwarding of the packet. The forwarding device is further configured to evaluate the service requirements in view of the forwarding information at multiple layers to dynamically adjust one or more parameters within the LLN for forwarding packets within the LLN. In one example, the forwarding device the adjustment of the one or more parameters comprises selection of one or more LLN forwarding mechanisms for use in forwarding the packet towards the destination device.

Example Embodiments

LLNs may be used for a wide variety of purposes including, but not limited to, industrial monitoring, building automation (e.g., lighting, security/access control, fire, heating, ventilation, and air conditioning (HVAC)), connected homes, healthcare, environmental monitoring, urban sensor or utility systems (e.g., Smart Grid), utility distribution control, asset tracking, etc. In certain examples, an LLN (or a portion thereof) may be a multi-service LLN. A multi-service LLN is a network or network segment that is shared by multiple applications.

Figure 1:
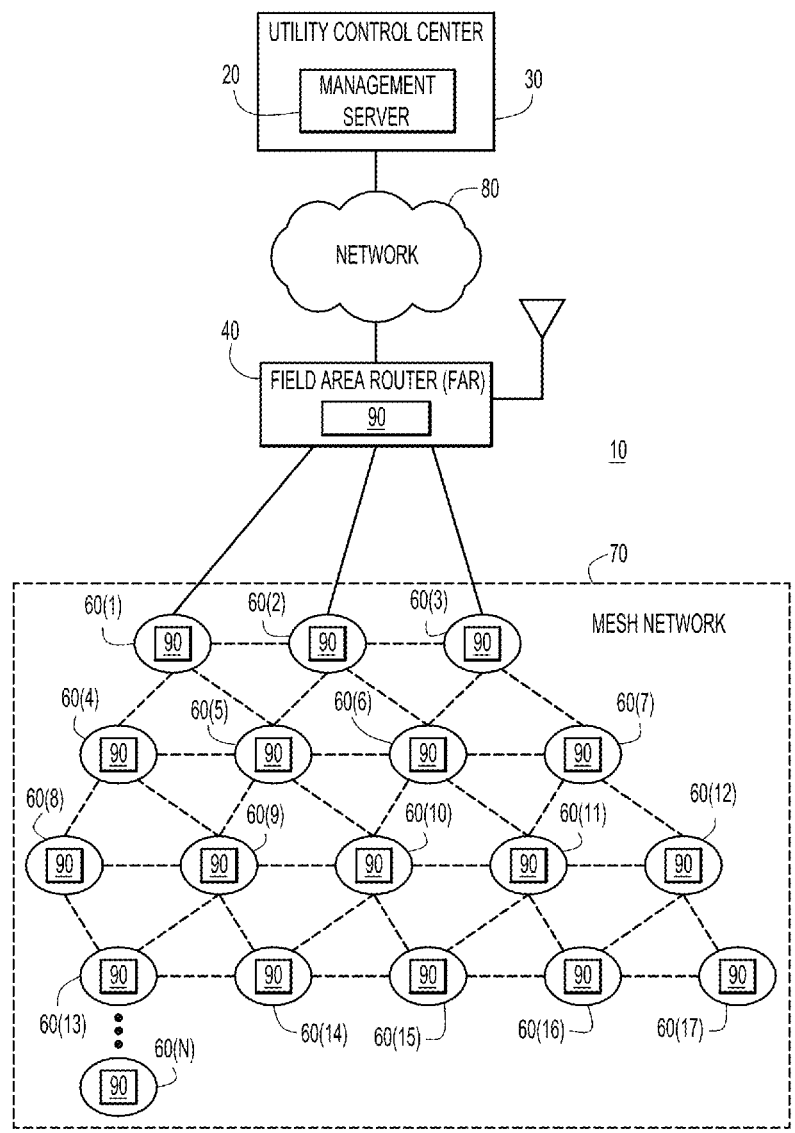
FIG. 1 is a block diagram illustrating an example Low-power and Lossy Network (LLN) deployment in which cross-layer forwarding techniques may be used.

FIG. 1 is a block diagram illustrating an example multi-service LLN 10 that is used by a utility provider and that is configured to perform cross-layer forwarding techniques described herein. In the example of FIG. 1, the LLN 10 is shared by a monitoring application (e.g., to read meters at business, homes, etc.) and a distribution control application (e.g., for closed loop control of a distribution grid). It is to be appreciated that the utility deployment of FIG. 1 is merely illustrative and other deployments are possible.

The LLN 10 comprises a utility control center 30, at least one Field Area Router (FAR) 40, and a plurality of devices 60(1)-60(N). The devices 60(1)-60(N) are interconnected with one another so as to form a "mesh" of devices that is referred to herein as mesh network 70. The devices 60(1)-60(N) within the mesh network are also referred to herein as mesh devices 60(1)-60(N).

In the utility network deployment of FIG. 1, the mesh devices 60(1)-60(N) are primarily meter devices (i.e., devices at homes or business that record utility usage). However, one or more of the mesh devices 60(1)-60(N) may alternatively be switches, relays, range extenders, distribution automation devices, and/or other devices that are remotely controlled by a management server 20 that, in this example, is in the utility control center 30.

In certain circumstances, the mesh devices 60(1)-60(N) and FAR 40 may operate as forwarding devices. That is, the mesh devices 60(1)-60(N) and FAR 40 may operate as intermediate networking nodes that receive data packets (traffic) transmitted by a source device to a destination device. Upon receiving a packet, a mesh device 60(1)-60(N) and/or the FAR 40 forwards a received packet towards the destination device.

The mesh devices 60(1)-60(N) may communicate with each other and the FAR 40 according to the IEEE 802.15.4 communication standard. The FAR 40 communicates with the management server 20 by way of the network 80 and provides wide area network (WAN) connectivity for the mesh devices 60(1)-60(N) in the LLN 10. There may be multiple FARs in a given LLN and a single FAR 40 is shown merely for ease of illustration.

In general, an LLN may experience a number of issues that may make communication between LLN nodes challenging. For example, the communication links between LLN nodes may be affected by changing environmental conditions, interference (e.g., from wireless networks or electrical appliances), physical obstructions (e.g. doors opening/closing or seasonal changes in foliage density of trees), and propagation characteristics of the physical media (e.g. temperature or humidity changes). As such, links between neighboring LLN nodes may be reliable at some points in time, but unreliable at other points in time.

Due to the dynamic nature of LLN links, forwarding mechanisms have been developed for packet forwarding in an LLN. These LLN forwarding mechanisms include, by way of example, multi-path forwarding techniques, dynamic selection of a multicast method based on the amount of state a device must store, and dynamic use of localized 1+1 protection upon detection of a weak or failed link.

As noted above, LLN 10 is a multi-service LLN shared by a plurality of applications that may have a number of different service requirements. For example, a meter reading application supported by the LLN 10 may have relaxed latency and reliability requirements (i.e., high latency and low reliability is acceptable within the meter reading application). However, a distribution automation application supported by the LLN 10 may have stringent latency and reliability requirements (i.e., low latency and high reliability are required within the distribution automation application). The above conventional arrangements do not use cross-layer information to dynamically employ the use of lower-layer optimizations on a per-packet basis and, as such, do not have the ability to efficiently use the LLN resources to support multiple applications while satisfying the varying service requirements of the applications. As such, proposed herein are cross-layer forwarding techniques that utilize cross-layer information to dynamically select one or more LLN forwarding mechanisms for use in forwarding packets through an LLN, such as LLN 10. The LLN forwarding mechanisms may be selected on a per-packet basis to ensure that the service requirements of different applications are met in a manner that efficiently uses the LLN resources.

More specifically, in accordance with the cross-layer forwarding techniques presented herein, a forwarding device obtains information about a packet from a plurality of layers of the networking stack (e.g., latency/reliability requirements, packet delivery rate, etc. from the application layer, routing topology information, path reliability/latency from the network layer, etc.). Using the collected information, the forwarding device can dynamically adjust one or more parameters within the LLN used to forward packets. In one example, the adjustment of one or more parameters comprises selection of one or more LLN forwarding mechanisms (optimizations) (e.g., multi-path forwarding techniques, changes to a link-layer retransmission threshold, changes to a timer, etc.). The adjustment of the one or more parameters may also comprise dynamically preempting existing traffic to grant a higher priority at the Media Access Control (MAC) layer for use in forwarding received packets. The one or more parameter adjustments may be based on whether the adjustments allow the forwarding device to satisfy the service requirements associated with a packet/application and the associated resource costs (i.e., how costly, in terms of network resources, the mechanism may be to implement). In general, adjustments (e.g., LLN forwarding mechanisms) that are the least costly, but that satisfy the QoS requirements are selected. In certain embodiments, the forwarding device is configured to mark packets in a manner that records the adjustments used to forward the packet (e.g., reducing each packet's reliability requirement after copying a packet for multi-path forwarding). In summary, the cross-layer forwarding techniques provide a method that utilizes information across the network stack (link to application layers) to dynamically employ the use of mesh networking optimizations on a per-packet basis.

As shown in FIG. 1, the mesh devices 60(1)-60(N) and the FAR 40 each include a cross-layer forwarding module 90 that is configured to implement the cross-layer forwarding techniques presented herein. The cross-layer forwarding modules 90 may be implemented in hardware and/or software, and may have varying degrees of functionality depending, for example, on the type of device, location in the LLN 10, etc. For example, in certain embodiments the cross-layer forwarding module 90 at FAR 40 may have more functionality than a cross-layer forwarding module in a range extender within the mesh network 70 Likewise, the cross-layer forwarding module within the range extender may have more functionality than a metering device within the mesh network 70.

Figure 2:
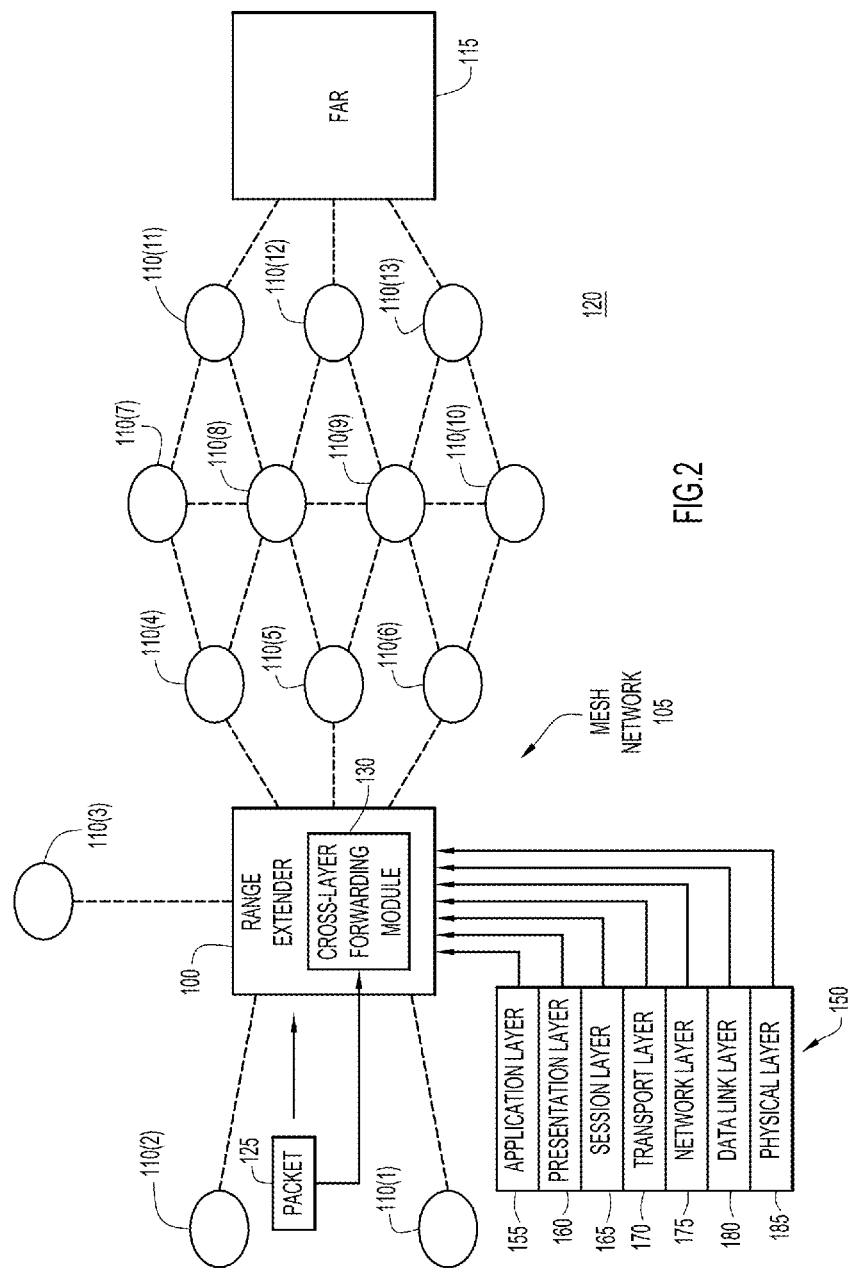
FIG. 2 is a schematic diagram illustrating the use of cross-layer forwarding techniques in accordance with examples presented herein.

Reference is now made to FIG. 2. FIG. 2 is a schematic diagram illustrating further details of cross-layer forwarding techniques executed at a range extender 100 that is part of a mesh network 105. As shown, the mesh network 105 comprises a plurality of other mesh devices 110(1)-110(13) that may be, for example, meter devices, other range extenders, distribution automation devices, etc. Connected to the mesh network 105 is a FAR 115. The mesh network 105 and the FAR 115, along with a second network (not shown in FIG. 2) and other components (also not shown in FIG. 2) may collectively form an LLN 120.

It is to be appreciated that FIG. 2 illustrates a specific example of the arrangement of FIG. 1. That is, the range extender 100 is a specific instance of a mesh device 60(1)-60(N) and the cross-layer forwarding module 130 corresponds to the cross-layer forwarding modules 90 of FIG. 1. Similarly, the FAR 115 in FIG. 2 corresponds to FAR 40 of FIG. 1.

In the example of FIG. 2, a mesh device 110(1) transmits a packet 125 to a destination device (not shown). The mesh device 110(1) is, in this example, a meter device and the packet 125 may be transmitted to a management server in a utility control center (e.g., as depicted in FIG. 1). It is to be appreciated that, in certain examples a device such as mesh device 110(1) may transmit a plurality of packets to a destination device. As such, it is to be appreciated that the use of a single packet 125 in FIG. 2 is merely for ease of illustration.

Returning to the example of FIG. 2, the packet 125 transmitted by mesh device 110(1) is first received by range extender 100. Range extender 100 includes a cross-layer forwarding module 130 that is configured to forward the packet 125 towards the destination device using the cross-layer forwarding techniques presented herein. The cross-layer forwarding module 130 may be implemented in hardware, software, or a combination of hardware/software.

After receiving the packet 125, the cross-layer forwarding module 130 identifies the application associated with the packet (e.g., the meter reading application, distribution automation application, etc.) That is, the cross-layer forwarding module 130 determines what application supported by the LLN 120 has transmitted the packet 125. In certain examples, the cross-layer forwarding module 130 identifies the application associated with the packet 125 based on information contained in the packet (e.g., an identified traffic class, option header, etc.)

Once the application associated with the packet is identified, the cross-layer forwarding module 130 retrieves the service requirements (e.g., reliability/latency requirements, packet delivery rate requirements, etc.) for the application associated with the packet. In certain circumstances, the service requirements for each application may be recorded locally (i.e., within memory) on the range extender 100. In other circumstances, a message (e.g., a Constrained Application Protocol (CoAP) message) may be defined that enables the range extender 100 to retrieve the associated packet from a management server or other data repository in the LLN 120. In another example, the actual service requirements for the application may be identified in the packet header (e.g., the service requirements may be inserted in the packet in the form of additional hop-by-hop Internet Protocol version 6 (IPv6) headers).

In one specific example of FIG. 2, the packet 125 is an IPv6 packet that includes a traffic class identifier in the header that is used to distinguish packets associated with different applications. That is, each application supported by the LLN 120 is assigned a specific traffic class identifier that may be carried in the IPv6 packets. The cross-layer forwarding module 130, upon receiving the packet 125, uses the traffic class identifier to identify the application associated with the packet. The cross-layer forwarding module 130 may then use one of the above or other methods to determine the service requirements for the application and hence for the packet.

The service requirements may, in certain circumstances, specific absolute values (e.g., a total latency (delay) for application A at 5 seconds, delivery reliability for application B of 90%, etc.). In another example, the service requirements may be in a more general form (e.g., a flag that indicates that the application requires high, medium, or low reliability or latency). It is to be appreciated that these are merely examples and that the service requirements for an application may vary and take a number of other forms as well.

As is well-known, the Open System Interconnection (OSI) model abstractly defines a networking framework to implement protocols in seven layers. FIG. 2 includes a schematic representation 150 of the OSI model and the seven networking layers that include the application layer 155, the presentation layer 160, the session layer 165, the transport layer 170, the network layer 175, the data link layer 180, and the physical layer 185. In operation, control is passed from one layer to the next, starting at the application layer 155 in one device, and proceeding to the bottom layer, over the channel to the next device and back up the hierarchy of layers.

In essence, the above retrieval of the service requirements results in the identification of application layer information associated with the forwarding of the packet 125. In addition to this application layer information, the cross-layer forwarding module 130 is further configured to obtain forwarding information from a plurality of other networking layers associated with forwarding of the packet 125 (i.e., other layers of the OSI model). For example, the cross-layer forwarding module 130 may obtain forwarding information from the network layer 175 that identifies the expected latency and/or reliability for reaching the packet's destination. Additionally, the cross-layer forwarding module 130 may obtain information from the data link layer 180 about the expected latency and/or reliability of reaching the packet's next-hop destination. The retrieval of forwarding information from a plurality of networking layers associated with forwarding of the packet 125 is schematically shown in FIG. 2 by arrows 190.

In one specific example, a routing protocol of the network layer 175 can provide information about the reliability along various paths through LLN 120 and/or latency toward a destination along those paths. As such, the network layer information may be obtained from the routing protocol itself or, alternatively, could be obtained by actively sending probe packets through the LLN 120 and receiving subsequent probe responses.

At the data link layer 180, it is standard that an acknowledgement message is received at a device that transmits a packet. The acknowledgement message is transmitted by the next hop (i.e., the next forwarding device in the LLN 12). As such, in certain examples the cross-layer forwarding module 130 (or other component) tracks the acknowledgement messages for subsequent use in determining the link conditions. The resulting information may be, for example, the expected number of transmissions needed before receiving an acknowledgement message. This information provides an indication of reliability and latency.

At the transport layer 170, the transport protocol (e.g., Transmission Control Protocol (TCP)) header may include information about, for example, what packets have been dropped. The cross-layer forwarding module 130 may examine the transport protocol header and maintain statistics about the reliability of various paths or latencies along those paths. As such, instead of just using the routing protocol to forward the packet, the cross-layer forwarding module 130 may additionally or alternatively monitor flows based on information from the transport layer 170 or the application layer.

In one example, the cross-layer forwarding module 130 could use application layer information to monitor the packet QoS requirements. Indeed, some application layers may encode the expected QoS, or may indicate that the packet has been retransmitted (that information may not be available at the transport layer if one uses UDP). If the application layer indicates that the packet is retransmitted this may influence the forwarding decision.

After obtaining forwarding information from the plurality of networking layers, the cross-layer forwarding module 130 evaluates the service requirements for the packet 125 (i.e., defined for the underlying application) in view of the other forwarding information to dynamically adjust one or more parameters within the LLN used to forward packets. This may include, for example, selection at the link layer of PHY parameters (e.g., modulation, data rate, tone map, etc. that trade data rate vs. robustness), selection at the link layer of MAC parameters (e.g., backoff window, clear-channel assessment, etc. that trade congestion avoidance vs. latency), packet re-ordering at the network layer to service latency-critical packets first, etc.

In one example, the adjustment of one or more parameters comprises selection of one or more LLN forwarding mechanisms (optimizations) (e.g., multi-path forwarding techniques, changes to a link-layer retransmission threshold, selection of a different path, changes to a timer, etc.). The adjustment of the one or more parameters may also comprise dynamically preempting existing traffic to grant a higher priority at the MAC layer for use in forwarding received packets. It is to be that the various parameter adjustments listed above are merely illustrative and other adjustments are possible.

In certain circumstances, the networking layer parameters are adjusted in isolation based on the properties of packet 125 (i.e., network layer decisions are made independent of the link layer). However, in other embodiments the cross-layer forwarding module 130 considers information from a plurality of networking layers to adjust one or more LLN parameters. It is to be appreciated that the cross-layer forwarding module 130 may evaluate the service requirements in view of forwarding information from a plurality of other layers in a number of different manners based on the network topology and number of available parameter adjustments. For example, the cross-layer forwarding module 130 may use the forwarding information to generate reliability and/or latency estimates for all or a selected number of different parameter adjustments or combinations of parameter adjustments. Using statistical approaches, the cross-layer forwarding module 130 may determine and select the parameter adjustments that enable the forwarding device to satisfy the service requirements for packet 125 with the lowest cost (i.e., the parameter adjustment(s) that place the least load on LLN infrastructure). As such, in certain examples, cost metrics may be computed for the all or a selected number of different parameter adjustment(s) or combinations of parameter adjustment(s). Cost metrics may take into account, for example, how many transmissions it takes to successfully transmit a packet, the number of paths used, etc.

In certain examples, a subset of parameter adjustment(s) (or combinations of parameter adjustment(s)) may be known or previously determined to typically satisfy certain service requirements with the lowest costs. In such examples, this subset may be the only parameter adjustment(s) that are evaluated during the evaluation process. In this way, the evaluation space may be greatly reduced (e.g., evaluate five predetermined combinations instead of hundreds or thousands of combinations).

In one specific example, when forwarding packet 125, the cross-layer forwarding module 130 may determine the high-throughput metric (ETX) for a path and expected latency for delivering a packet to its destination along the path. The ETX for the path provides information on the path's reliability. If that reliability is above the packet's requirements, then the cross-layer forwarding module 130 may forward the packet without using any additional parameter adjustment(s). However, if the reliability is below the packet's reliability threshold, then the cross-layer forwarding module 130 will evaluate whether to use other parameter adjustment(s) (e.g., backtracking, multi-path forwarding, etc.). Combining reliability and communication latency, the cross-layer forwarding module 130 can determine the expected latency of delivering a packet along a single path vs. multiple paths.

After selection of the one or more parameter adjustment(s), the cross-layer forwarding module 130 forwards the packet 125 towards the destination device using those selected parameter adjustment(s). In certain examples, the cross-layer forwarding module 130 may mark the packet 125 upon exit to indicate which parameter adjustment(s) where used to forward the packet.

More specifically, when the packet 125 first enters the LLN 120, it may be unmarked and initialized based on traditional techniques (e.g., Traffic Class markings, Deep Packet Inspection, etc.). However, after one or more parameter adjustment(s) have been used, the packet 125 should provide information about what strategies so that forwarding devices further down the path can take those decisions into account. For example, once a forwarding device selects multi-path forwarding, it may choose to reduce the reliability requirement for each copy of the packet. In other words, the forwarding device may utilize a single path with an increased link-layer retransmission threshold or multiple paths with a decreased link-layer retransmission threshold. If a packet is being transmitted along multiple paths, each path need not employ as much in the way of reliability techniques to ensure packet delivery.

In certain examples, the cross-layer forwarding techniques may include a feedback loop that enables cross-layer forwarding module 130 to learn about the parameter adjustment(s) that it selected and determine if those adjustments where successful in satisfying the requirements for packet 125. In such examples, upon receiving a packet forwarded from cross-layer forwarding module 130, the destination device may send feedback packets back to the various forwarding devices in the successful path, along with a copy of the packet and an indication on the actual QoS that was achieved.

In one example, a set of X packets with similar multi-layer profiles (same application, Differentiated services code point (DSCP), etc.) received with long delays may trigger the transmission of feedback packets back to the forwarding devices along the path in order for those forwarding devices to adapt their multi-layer routing strategies (a copy of the packet is also provided or a subset of the IPv6 header). As a result, the forwarding devices along the path may subsequently decide to favor links with lower latency or a higher path ETX (in order to get lower retransmission).

FIG. 2 has been described with reference to execution of the cross-layer forwarding techniques at range extender 100. It is to be appreciated that the cross-layer forwarding techniques may be executed at other devices (e.g., FAR 115) in the LLN 120. However, it is to be appreciated that not all forwarding devices employ the same parameter adjustment(s) (e.g., LLN forwarding mechanisms) or have the same information accessible to them. For example, a RPL Root/Border Router (i.e. Connected Grid Router) may have much more information about the routing topology (i.e. in non-storing mode) and obtain additional information through Data Access Object (DAO) messages. In this case, the RPL Root may have the ability to employ multi-path forwarding by utilizing different source routes towards a destination. However, other RPL devices may only be able to optimize their link-layer parameters based on the packet's reliability and latency requirements.

Figure 3:
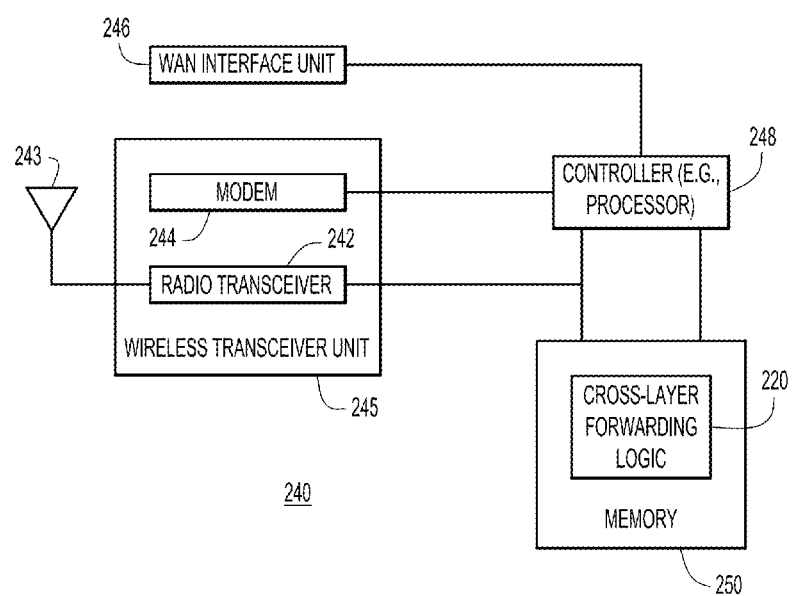
FIG. 3 is a block diagram of an example field area router configured to perform cross-layer forwarding techniques in an LLN network.

FIG. 3 illustrates a block diagram of a FAR 240 according to one example presented herein, and which is configured to perform the techniques presented herein (corresponding to FAR 40 in FIG. 1 and FAR 115 in FIG. 2). The FAR 240 is a device that is configured to communicate with a mesh network and to communicate over a WAN connection on behalf of the devices in the mesh network for data/control purposes. To this end, the FAR 240 comprises a radio transceiver 242, at least one antenna 243, a modem 244, a WAN interface unit 246, a controller 248 and a memory 250.

The WAN interface unit 246 may be a wired network interface unit (e.g., an Ethernet card) or a wireless interface unit (e.g., cellular or WiMAX™ interface wireless interface unit). In one example, the radio transceiver 22 and modem 244 comprise one or more integrated circuit chips that are configured to perform wireless communication in accordance with the IEEE 802.15.4 wireless personal area network (WPAN) communication protocol to communicate with wireless devices in the mesh network. The radio transceiver 242 and modem 244 may be considered parts of a wireless transceiver unit 245. The WAN interface unit 246 enables WAN communications so that the FAR 240 can communicate with servers or other devices reachable over a LAN or WAN. The controller 248 is a data processor, e.g., a microprocessor or microcontroller that is configured to execute software instructions stored in memory 250. In the case in which the LLN is a wired network, then the wireless transceiver unit 245 is a transceiver unit comprising a transceiver 242 and a modem 244 that are configured for wired communication over a wired (copper or optical) network media.

The memory 250 may comprise read only memory (ROM), random access memory (RAM), magnetic disk storage media devices, optical storage media devices, flash memory devices, electrical, optical, or other physical/tangible memory storage devices. The memory 250 stores computer executable software instructions for cross-layer forwarding logic 220. The cross-layer forwarding logic 220 comprises software instructions that cause the controller 248 to perform cross-layer forwarding operations (e.g., operations of cross-layer forwarding module 130 of FIG. 2). Thus, in general, the memory 250 may comprise one or more tangible computer readable storage media (e.g., a memory device) encoded with software comprising computer executable instructions and when the software is executed (by the controller 248) it is operable to perform the operations described herein in connection with cross-layer forwarding logic 220.

Figure 4:
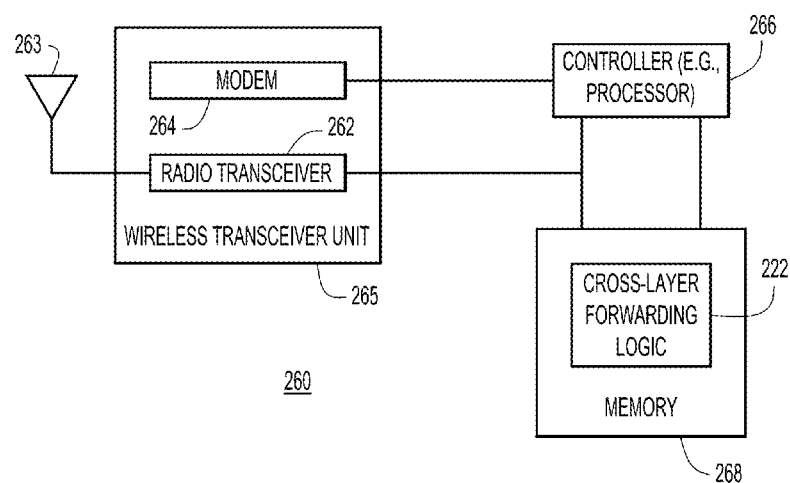
FIG. 4 is a block diagram of an example mesh device configured to perform cross-layer forwarding techniques in an LLN network.

Reference is now made to FIG. 4 for a description of an example of a block diagram of a mesh device (e.g., that can serve as any of the mesh devices referred to above in connection with FIGS. 1 and 2), generically referred to at reference numeral 260 that is configured to perform cross-layer forwarding operations. The mesh device 260 comprises a radio transceiver 262, at least one antenna 263, a modem 264, a controller 266 and a memory 267. In one example, the radio transceiver 262 and modem 264 comprise one or more integrated circuit chips that are configured to perform wireless communication in accordance with the IEEE 802.15.4 WPAN communication protocol to communicate with other mesh devices in a mesh network and with a FAR.

The radio transceiver 262 and modem 264 may be considered parts of a wireless transceiver unit 265. The controller 266 is a data processor, e.g., a microprocessor or microcontroller that is configured to execute software instructions stored in memory 268. In the case in which the LLN is a wired network, then the wireless transceiver unit 265 is a transceiver unit comprising a transceiver 262 and a modem 264 that are configured for wired communication over a wired (copper or optical) network media.

The memory 268 may comprise ROM, RAM, magnetic disk storage media devices, optical storage media devices, flash memory devices, electrical, optical, or other physical/tangible memory storage devices. The memory 268 stores computer executable software instructions for cross-layer forwarding logic 222. The cross-layer forwarding logic 222 comprises software instructions that cause the controller 266 to perform cross-layer forwarding operations (e.g., operations of cross-layer forwarding module 130 of FIG. 2). Thus, in general, the memory 268 may comprise one or more tangible computer readable storage media (e.g., a memory device) encoded with software comprising computer executable instructions and when the software is executed (by the controller 266) it is operable to perform the operations described herein in connection with cross-layer forwarding logic 222.

Figure 5:
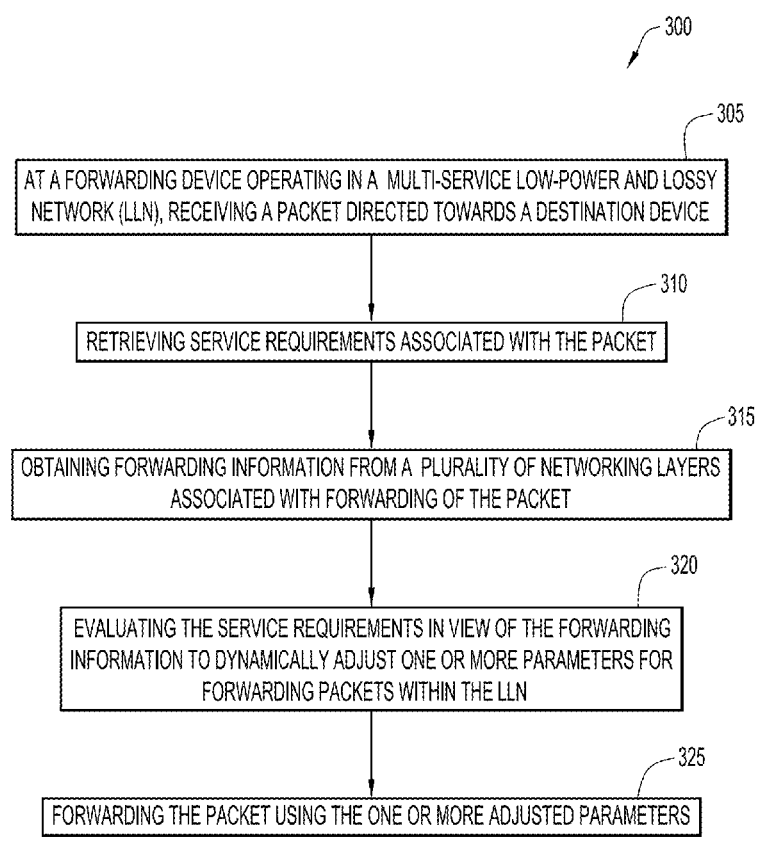
FIG. 5 is a flow chart depicting operations performed during an example cross-layer forwarding method.

FIG. 5 is a flowchart of a method 300 in accordance with examples presented herein. Method 300 begins at 305 where a packet is received at a forwarding device operating in a multi-service LLN. At 310, the forwarding device retrieves service requirements associated with the packet and at 315 the forwarding device obtains forwarding information from a plurality of networking layers associated with forwarding of the packet. At 320, the forwarding device evaluates the service requirements in view of the forwarding information to dynamically adjust one or more parameters for forwarding packets within the LLN. At 325, the forwarding device forwards the packet using the one or more adjusted parameters. In certain examples, prior to forwarding, the packet is marked with an indication of the adjusted parameters used to forward the packet.

While the techniques presented herein are described in connection with a wireless LLN (e.g., a wireless mesh network), this is only an example and not meant to be limiting. LLNs are not necessarily constrained to wireless networks and can also apply to wired environments. For example, Power Line Communication (PLC) technology is a wired connectivity technology that exhibits many of the same characteristics as wireless mesh networks (relatively high loss rates compared to traditional link technologies used in IP networks, time-varying link qualities and interference, and a communication medium that is not a single broadcast domain, etc.). In general, an LLN refers to any network that communicates over links that exhibit higher loss rates than a typical Ethernet-based network and connectivity is not well-defined by physical connections. Thus, the techniques described herein are applicable to wireless and wired LLN environments.

The cross-layer forwarding techniques presented herein allow a much more dynamic approach to dealing with varying traffic profiles and network characteristics within an LLN. By taking a cross-layer approach in optimizing packet delivery, the network can make the proper tradeoffs on a per-packet basis. When using both application and network layer information when forwarding a packet, these techniques minimize networking overhead by ensuring that the proper techniques are employed only when needed.

The above description is intended by way of example only.

What is claimed is:

1. A method comprising:
   at a forwarding device operating in a multi-service Low-power and Lossy Network (LLN), receiving a packet directed towards a destination device;
   identifying a particular application with which the packet is associated from among a plurality of applications operating in the LLN at the forwarding device;
   retrieving service requirements associated with the packet based on the particular application with which the packet is associated, the service requirements being application layer information;
   obtaining forwarding information from a plurality of networking layers associated with forwarding of the packet, the forwarding information comprising latency or reliability information; and
   evaluating the service requirements in view of the forwarding information to dynamically adjust one or more parameters for forwarding packets within the LLN.

2. The method of claim 1, further comprising:
   forwarding the packet to the destination device using the one or more adjusted parameters; and
   prior to forwarding the packet, marking the packet to indicate the one or more adjusted parameters.

3. The method of claim 1, further comprising:
   receiving feedback from the destination device indicating whether the one or more adjusted parameters resulted in satisfaction of the service requirements associated with the packet.

4. The method of claim 1, wherein evaluating the service requirements in view of the forwarding information to dynamically adjust one or more parameters for forwarding packets within the LLN comprises:
   evaluating the service requirements in view of the forwarding information to dynamically select one or more LLN forwarding mechanisms for use in forwarding the packet towards the destination device.

5. The method of claim 4, wherein evaluating the service requirements in view of the forwarding information to dynamically select one or more LLN forwarding mechanisms comprises:
dynamically selecting one or more of a multi-path forwarding technique, a link-layer retransmission threshold, or a timer for use in forwarding the packet.

6. The method of claim 1, wherein evaluating the service requirements in view of the forwarding information to dynamically adjust one or more parameters within the LLN for forwarding packets within the LLN comprises:
dynamically preempting existing traffic to grant a higher priority at the Media Access Control (MAC) layer for use in forwarding the packet.

7. The method of claim 1, further comprising storing the service requirements for each of the plurality of applications operating in the LLN at the forwarding device, and wherein retrieving the service requirements associated with the packet comprises:
obtaining information from the packet indicating the particular application with which the packet is associated; and
obtaining the service requirements locally stored at the forwarding device for the particular application.

8. The method of claim 1, wherein retrieving the service requirements associated with the packet comprises:
retrieving the service requirements directly from the packet.

9. The method of claim 1, wherein obtaining forwarding information from a plurality of networking layers associated with the forwarding of the packet comprises:
obtaining information from a particular networking layer that provides the expected latency or reliability for reaching the destination device via one or more paths within the LLN.

10. The method of claim 1, wherein obtaining forwarding information from a plurality of networking layers associated with the forwarding of the packet comprises:
obtaining information about the expected latency or reliability of reaching a next hop within the LLN from a link layer of the plurality of networking layers.

11. An apparatus, comprising:
a transceiver unit configured to send and receive messages over a mesh network within a a Low-power and Lossy Network (LLN); and
a processor coupled to the transceiver unit, and configured to:
receive a packet directed towards a destination device;
identify a particular application with which the packet is associated from among a plurality of applications operating in the LLN at the forwarding device;
retrieve service requirements associated with the packet based on the particular application with which the packet is associated, the service requirements being application layer information;
obtain forwarding information from a plurality of networking layers associated with forwarding of the packet, the forwarding information comprising latency or reliability information; and
evaluate the service requirements in view of the forwarding information to dynamically adjust one or more parameters for forwarding packets within the LLN.

12. The apparatus of claim 11, wherein the processor is configured to:

forward the packet to the destination device using the one or more adjusted parameters; and
prior to forwarding the packet, mark the packet to indicate the one or more adjusted parameters.

13. The apparatus of claim 11, wherein the processor is configured to:
receive feedback from the destination device indicating whether the one or more adjusted parameters resulted in satisfaction of the service requirements associated with the packet.

14. The apparatus of claim 11, wherein to evaluate the service requirements in view of the forwarding information to dynamically adjust one or more parameters for forwarding packets within the LLN, the processor is configured to:
evaluate the service requirements in view of the forwarding information to dynamically select one or more LLN forwarding mechanisms for use in forwarding the packet towards the destination device.

15. The apparatus of claim 14, wherein to evaluate the service requirements in view of the forwarding information to dynamically select one or more LLN forwarding mechanisms, the processor is configured to:
dynamically select one or more of a multi-path forwarding technique, a link-layer retransmission threshold, or a timer for use in forwarding the packet.

16. The apparatus of claim 11, wherein to evaluate the service requirements in view of the forwarding information to dynamically adjust one or more parameters within the LLN for forwarding packets within the LLN, the processor is configured to:
dynamically preempt existing traffic to grant a higher priority at the Media Access Control (MAC) layer for use in forwarding the packet.

17. The apparatus of claim 11, wherein the processor is configured to store the service requirements for each of the plurality of applications operating in the LLN at a memory, and wherein to retrieve the service requirements associated with the packet, the processor is configured to:
obtain information from the packet indicating the particular application with which the packet is associated; and
obtain the service requirements locally stored at the forwarding device for the particular application.

18. The apparatus of claim 11, wherein to retrieve the service requirements associated with the packet, the processor is configured to
retrieve the service requirements directly from the packet.

19. One or more non-transitory computer readable storage media encoded with instructions that when executed are operable to:
at a forwarding device operating in a multi-service Low-power and Lossy Network (LLN), receive a packet directed towards a destination device;
identify a particular application with which the packet is associated from among a plurality of applications operating in the LLN at the forwarding device;
retrieve service requirements associated with the packet based on the particular application with which the packet is associated, the service requirements being application layer information;
obtain forwarding information from a plurality of networking layers associated with forwarding of the packet, the forwarding information comprising latency or reliability information; and
evaluate the service requirements in view of the forwarding information to dynamically adjust one or more parameters for forwarding packets within the LLN.

20. The computer readable storage media of claim 19, further comprising instructions operable to:
  forward the packet to the destination device using the one or more adjusted parameters; and
  prior to forwarding the packet, mark the packet to indicate the one or more adjusted parameters.

21. The computer readable storage media of claim 19, further comprising instructions operable to:
  receive feedback from the destination device indicating whether the one or more adjusted parameters resulted in satisfaction of the service requirements associated with the packet.

22. The computer readable storage media of claim 19, wherein the instructions operable to evaluate the service requirements in view of the forwarding information to dynamically adjust one or more parameters for forwarding packets within the LLN comprise instructions operable to:
  evaluate the service requirements in view of the forwarding information to dynamically select one or more LLN forwarding mechanisms for use in forwarding the packet towards the destination device.

23. The computer readable storage media of claim 22, wherein the instructions operable to evaluate the service requirements in view of the forwarding information to dynamically select one or more LLN forwarding mechanisms comprise instructions operable to:
  dynamically select one or more of a multi-path forwarding technique, a link-layer retransmission threshold, or a timer for use in forwarding the packet.

24. The computer readable storage media of claim 19, wherein the instructions operable to evaluate the service requirements in view of the forwarding information to dynamically adjust one or more parameters within the LLN for forwarding packets within the LLN comprise instructions operable to:
  dynamically preempt existing traffic to grant a higher priority at the Media Access Control (MAC) layer for use in forwarding the packet.

25. The computer readable storage media of claim 19, further comprising instructions operable to store the service requirements for each of the plurality of applications operating in the LLN at the forwarding device, and wherein the instructions operable to retrieve the service requirements associated with the packet comprise instructions operable to:
  obtain information from the packet indicating the particular application with which the packet is associated; and
  obtain the service requirements locally stored at the forwarding device for the particular application.

\* \* \* \* \*